(12) United States Patent
Wang

(10) Patent No.: US 11,178,664 B2
(45) Date of Patent: *Nov. 16, 2021

(54) POWER CONTROL METHOD AND APPARATUS

(71) Applicant: HUAWEI TECHNOLOGIES CO., LTD., Shenzhen (CN)

(72) Inventor: Fan Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/941,167

(22) Filed: Mar. 30, 2018

(65) Prior Publication Data

US 2018/0227924 A1   Aug. 9, 2018

Related U.S. Application Data

(63) Continuation of application No. 14/850,045, filed on Sep. 10, 2015, now Pat. No. 9,949,266, which is a
(Continued)

(51) Int. Cl.
*H04W 72/04* (2009.01)
*H04W 52/16* (2009.01)
(Continued)

(52) U.S. Cl.
CPC ....... *H04W 72/0473* (2013.01); *H04L 1/1861* (2013.01); *H04W 52/16* (2013.01);
(Continued)

(58) Field of Classification Search
CPC .......... H04W 72/0473; H04W 52/325; H04W 52/16; H04W 52/346; H04W 72/0406; H04L 1/1861

See application file for complete search history.

(56) References Cited

U.S. PATENT DOCUMENTS 8,908,811 B2 * 12/2014 Chen .................... H04B 7/0417
                                                                                375/340
9,042,357 B2   5/2015 Seo
(Continued)

FOREIGN PATENT DOCUMENTS

CN     1697341     11/2005
CN     1983849      6/2007
(Continued)

OTHER PUBLICATIONS

WO 2012/154094 AI (Year: 2012).*
(Continued)

*Primary Examiner* — Ian N Moore
*Assistant Examiner* — Rushil Parimal Sampat
(74) *Attorney, Agent, or Firm* — Stein IP, LLC

(57) ABSTRACT

A power control method and apparatus that relates to the field of communications technologies. The method includes: determining, according to a power offset parameter configured by a network side, a first power offset value used by a control channel corresponding to a first subframe, and determining a second power offset value used by a control channel corresponding to a second subframe; feeding back the control channel corresponding to the first subframe to the network side by using the first power offset value; and feeding back the control channel corresponding to the second subframe to the network side by using the second power offset value. The power control method and apparatus are applicable to a multiflow transmission scenario in which a UE feeds back control information to a network side.

14 Claims, 5 Drawing Sheets

Related U.S. Application Data continuation of application No. PCT/CN2013/072465, filed on Mar. 12, 2013.

(51) Int. Cl.
  *H04W 52/32* (2009.01)
  *H04L 1/18* (2006.01)
  *H04W 52/34* (2009.01)

(52) U.S. Cl.
  CPC ....... *H04W 52/325* (2013.01); *H04W 52/346* (2013.01); *H04W 72/0406* (2013.01)

(56) References Cited

U.S. PATENT DOCUMENTS

| | | | |
|---|---|---|---|
| 9,144,037 B2 | 9/2015 | Seong | |
| 9,331,832 B2 | 5/2016 | Lindbom | |
| 9,509,468 B2* | 11/2016 | Furuskar | H04W 52/143 |
| 10,681,650 B2* | 6/2020 | Iwai | H04L 5/0048 |
| 2003/0174676 A1 | 9/2003 | Willenegger | |
| 2004/0009767 A1 | 1/2004 | Lee | |
| 2007/0106922 A1 | 5/2007 | Obuchi | |
| 2009/0196192 A1 | 8/2009 | Lim | |
| 2011/0249656 A1* | 10/2011 | Cai | H04L 1/0028 370/336 |
| 2012/0176947 A1 | 7/2012 | Xi et al. | |
| 2012/0257568 A1 | 10/2012 | Cai | |
| 2013/0114425 A1 | 5/2013 | Sayana | |
| 2013/0194940 A1* | 8/2013 | Li | H04J 11/0023 370/252 |
| 2014/0079020 A1 | 3/2014 | Caverni | |
| 2014/0086166 A1 | 3/2014 | Lindbom | |
| 2014/0086203 A1* | 3/2014 | Furuskar | H04W 52/244 370/330 |
| 2014/0098746 A1 | 4/2014 | Luo | |
| 2015/0207607 A1 | 7/2015 | Zhenfei et al. | |
| 2015/0382358 A1 | 12/2015 | Wang | |

FOREIGN PATENT DOCUMENTS

| | | |
|---|---|---|
| CN | 103181108 | 6/2013 |
| WO | 2011/100646 A1 | 8/2011 |
| WO | WO 2011105806 | 9/2011 |
| WO | 2012/044988 A1 | 4/2012 |
| WO | WO 2012/154094 | 11/2012 |
| WO | WO2012154094 | 11/2012 |

OTHER PUBLICATIONS

Office Action, dated Jul. 4, 2017, in Chinese Application No. 201380000235.4.
Extended European Search Report dated Feb. 11, 2016 corresponding to 13877517.6.
International Search Report dated Dec. 19, 2013 in corresponding International Application No. PCT/CN2013/072465.
*HS-DPCCH quality for MF-HSDPA transmissions*; 3GPP TSG RAN WG1 Meeting #68, R1-120339, Dresden. Germany, Feb. 6-10, 2012 (7 pp.).
Non-Final Office Action dated Jan. 31, 2017 in parent U.S. Appl. No. 14/850,045 (21 pages).
Final Office Action dated Jul. 7, 2017 in parent U.S. Appl. No. 14/850,045 (8 pages).
Notice of Allowance dated Dec. 14, 2017 in parent U.S. Appl. No. 14/850,045 (16 pages).
Corrected Notice of Allowance dated Jan. 9, 2018 in parent U.S. Appl. No. 14/850,045 (5 pages).
Corrected Notice of Allowance dated Jan. 18, 2018 in parent U.S. Appl. No. 14/850,045 (5 pages).
U.S. Appl. No. 14/850,045, filed Sep. 10, 2015, Fan Wang, Huawei Technologies Co., Ltd. Shenzhen, P.R. China.

* cited by examiner

POWER CONTROL METHOD AND APPARATUS

CROSS-REFERENCE TO RELATED APPLICATIONS

This application is a continuation of U.S. patent application Ser. No. 14/850,045, filed on Sep. 10, 2015, now issued as U.S. Pat. No. 9,949,266, which is a continuation of International Application No. PCT/CN2013/072465 filed on Mar. 12, 2013. All of the afore-mentioned patent applications are hereby incorporated by reference in their entireties.

TECHNICAL FIELD

The present invention relates to the field of communications technologies, and in particular, to a power control method and apparatus.

BACKGROUND

In Release R11 (Release 11) of WCDMA (Wideband Code Division Multiple Access) of 3GPP (3rd Generation Partnership Project), multiflow transmission (Multi-Flow Transmission, MF-Tx for short in English) is supported, that is, multiple cells are allowed to simultaneously send HSDPA (High Speed Downlink Packet Access) data to a UE (user equipment), so as to improve edge UE throughput performance and cell downlink throughput performance Correspondingly, the UE separately feeds back an ACK (acknowledgement) and/or a CQI (channel quality indicator) to each cell. Further, in an SF-DC (Single-Frequency Dual-Cell) scenario, the UE may feed back an HS-DPCCH (high speed dedicated physical control channel) to each cell in a joint feedback manner.

The foregoing SF-DC is introduced to a HetNet (heterogeneous network). The HetNet is formed by a macro network and a micro network, the micro network is within coverage of the macro network, and a corresponding macro cell and micro cell may simultaneously send data to a UE located in the micro cell. To avoid causing interference to the other cell when the macro cell and the micro cell simultaneously send data to the UE, the macro cell may configure some downlink subframes as ABS (almost blank subframe) subframes. In this way, a downlink power of an ABS subframe is lower than that of another subframe; therefore, when performing, in a subframe that is within same time as the ABS subframe, downlink scheduling on a UE, the micro cell receives relatively small interference. After the SF-DC is introduced, the UE feeds back an HS-DPCCH to a macro base station and a micro base station by means of joint feedback, and the macro base station and the micro base station need to independently parse the HS-DPCCH to obtain feedback information that may be provided for a base station to perform downlink scheduling.

In the foregoing scenario in which the SF-DC is applied to the HetNet, the UE is relatively close to the micro base station but relatively far from the macro base station; therefore, when the UE feeds back the HS-DPCCH, quality of a signal received by the macro base station is weaker than that received by the micro base station, thereby causing imbalance in an uplink link. To improve this situation, a power offset range of the HS-DPCCH may be increased, so that the macro base station also obtains an HS-DPCCH with better signal quality.

In the prior art, at least a following problem exists: for an ABS subframe, an HS-DPCCH corresponding to the ABS subframe is almost of no help to a macro base station; however, a power offset setting of the ABS subframe is the same as that of a non-ABS subframe. Due to a relatively large power offset of the ABS subframe, more power is consumed when a UE feeds back the HS-DPCCH corresponding to the ABS subframe, and an HS-DPCCH with a large power offset causes larger interference to uplink communication signals of both a micro cell and a macro cell.

SUMMARY

Embodiments of the present invention provide a power control method and apparatus, which can resolve a problem that, in a heterogeneous network scenario, power consumption is excessively large when a UE feeds back an HS-DPCCH, can reduce power consumption of the UE and reduce uplink interference of a micro cell and a macro cell.

The technical solutions adopted in the embodiments of the present invention are as follows:

According to a first aspect, a power control method is provided, including:

determining, according to a power offset parameter configured by a network side, a first power offset value used by a control channel corresponding to a first subframe, and determining a second power offset value used by a control channel corresponding to a second subframe;

feeding back the control channel corresponding to the first subframe to the network side by using the first power offset value; and feeding back the control channel corresponding to the second subframe to the network side by using the second power offset value.

In a first possible implementation manner, the power offset parameter includes:

a first power offset parameter and a second power offset parameter; or a third power offset value.

With reference to the first possible implementation manner, in a second possible implementation manner, the determining, according to a power offset parameter configured by a network side, a first power offset value used by a control channel corresponding to a first subframe, and determining a second power offset value used by a control channel corresponding to a second subframe includes: determining the first power offset value according to the first power offset parameter, and determining the second power offset value according to the second power offset parameter.

Optionally, when the power offset parameter includes only the third power offset value, before the determining a first power offset value used by a control channel corresponding to a first subframe, the method further includes: receiving notification signaling sent by the network side, where the notification signaling carries a power offset adjustment parameter, and the power offset adjustment parameter includes a fourth power offset value or a power adjustment value; or obtaining a fourth power offset value by calculation according to the first subframe or obtaining, by calculation, a power adjustment value relative to the third power offset value.

With reference to the second possible implementation manner, in a third possible implementation manner, when the control channel corresponding to the first subframe is fed back to the network side by using the first power offset value, a subframe of the control channel includes only feedback information of a micro Pico cell, and the feedback information includes a hybrid automatic repeat request-acknowledgment HARQ-ACK and a channel quality indicator CQI.

Further, the determining, according to a power offset parameter configured by a network side, a first power offset value used by a control channel corresponding to a first subframe, and determining a second power offset value used by a control channel corresponding to a second subframe includes: determining the third power offset value as the second power offset value, and determining the fourth power offset value as the first power offset value; or determining a difference between the third power offset value and the power adjustment value as the first power offset value.

The notification signaling is radio resource control RRC signaling or physical layer signaling.

With reference to the first aspect, the first possible implementation manner of the first aspect, the second possible implementation manner of the first aspect, and the third possible implementation manner of the first aspect, in a fourth possible implementation manner, the first subframe is a subframe with a limitation on signal transmission or transmit power, and the second subframe is a subframe with no limitation on signal transmission or transmit power.

According to a second aspect, a power control apparatus is provided, including:

a determining unit, configured to: determine, according to a power offset parameter configured by a network side, a first power offset value used by a control channel corresponding to a first subframe, and determine a second power offset value used by a control channel corresponding to a second subframe; and a feedback unit, configured to feed back the control channel corresponding to the first subframe to the network side by using the first power offset value determined by the determining unit; and configured to feed back the control channel corresponding to the second subframe to the network side by using the second power offset value determined by the determining unit.

In a first possible implementation manner, the power offset parameter includes:

a first power offset parameter and a second power offset parameter; or a third power offset value.

With reference to the first possible implementation manner, in a second possible implementation manner, the determining unit is specifically configured to: determine the first power offset value according to the first power offset parameter, and determine the second power offset value according to the second power offset parameter.

Further, the apparatus includes: a receiving unit, configured to receive notification signaling sent by the network side, where the notification signaling carries a power offset adjustment parameter, and the power offset adjustment parameter includes a fourth power offset value or a power adjustment value; or a calculating unit, configured to obtain a fourth power offset value by calculation according to the first subframe or obtain, by calculation, a power adjustment value relative to the third power offset value.

With reference to the second possible implementation manner, in a third possible implementation manner, when the feedback unit feeds back the control channel corresponding to the first subframe to the network side by using the first power offset value, a subframe of the control channel includes only feedback information of a micro Pico cell, and the feedback information includes a hybrid automatic repeat request-acknowledgment HARQ-ACK and a channel quality indicator CQI.

Further, the determining unit is specifically onfigured to: determine the third power offset value as the second power offset value, and determine the fourth power offset value as the first power offset value; or determine a difference between the third power offset value and the power adjustment value as the first power offset value.

According to a third aspect, a user equipment is provided, including:

a processor, configured to: determine, according to a power offset parameter configured by a network side, a first power offset value used by a control channel corresponding to a first subframe, and determine a second power offset value used by a control channel corresponding to a second subframe; and a transmitter, configured to feed back the control channel corresponding to the first subframe to the network side by using the first power offset value determined by the processor; and configured to feed back the control channel corresponding to the second subframe to the network side by using the second power offset value determined by the processor.

In a first possible implementation manner, the power offset parameter includes:

a first power offset parameter and a second power offset parameter; or a third power offset value.

With reference to the first possible implementation manner, in a second possible implementation manner, the processor is specifically configured to: determine the first power offset value according to the first power offset parameter, and determine the second power offset value according to the second power offset parameter.

Further, the user equipment includes: a receiver, configured to receive notification signaling sent by the network side, where the notification signaling carries a power offset adjustment parameter, and the power offset adjustment parameter includes a fourth power offset value or a power adjustment value; or the processor, further configured to obtain a fourth power offset value by calculation according to the first subframe or obtain, by calculation, a power adjustment value relative to the third power offset value.

With reference to the second possible implementation manner, in a third possible implementation manner, when the transmitter feeds back the control channel corresponding to the first subframe to the network side by using the first power offset value, a subframe of the control channel includes only feedback information of a micro Pico cell, and the feedback information includes a hybrid automatic repeat request-acknowledgment HARQ-ACK and a channel quality indicator CQI.

Further, the processor is specifically configured to: determine the third power offset value as the second power offset value, and determine the fourth power offset value as the first power offset value; or determine a difference between the third power offset value and the power adjustment value as the first power offset value.

Compared with the prior art, in the embodiments of the present invention, according to a power offset parameter configured by a network side, a first power offset value used by a control channel corresponding to a first subframe can be determined, and a second power offset value used by a control channel corresponding to a second subframe is determined; the control channel corresponding to the first subframe is fed back to the network side by using the first power offset value; the control channel corresponding to the second subframe is fed back to the network side by using the second power offset value. For a UE working in multiflow transmission, different power offset values are used for HS-DPCCHs corresponding to different subframes, which resolves a problem that in a heterogeneous network scenario, more power is consumed when the UE feeds back an HS-DPCCH corresponding to an ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figure 1:
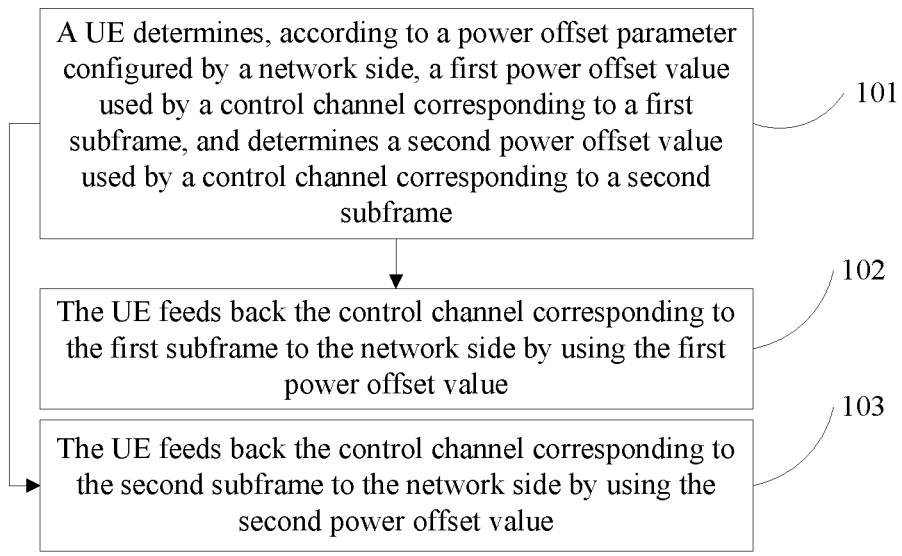
FIG. 1 is a flowchart of a method according to Embodiment 1 of the present invention.

This embodiment provides a power control method, where a UE works in a multiflow transmission mode and simultaneously performs data transmission with a macro cell and a micro cell. As shown in FIG. 1, the method includes:

101: The UE determines, according to a power offset parameter configured by a network side, a first power offset value used by a control channel corresponding to a first subframe, and determines a second power offset value used by a control channel corresponding to a second subframe.

When the network side configures the power offset parameter for the UE, a base station corresponding to a macro cell may perform configuration for the UE, or a base station corresponding to a micro cell may perform configuration for the UE, or two base stations perform joint configuration for the UE.

For example, the power offset parameter may include: a first power offset parameter and a second power offset parameter; or a third power offset value.

Optionally, when the power offset parameter includes the first power offset parameter and the second power offset parameter, the first power offset value is determined according to the first power offset parameter, and the second power offset value is determined according to the second power offset parameter. When the control channel corresponding to the first subframe is fed back to the network side by using the first power offset value, a subframe of the control channel includes only feedback information of a micro Pico cell, and the feedback information includes an HARQ (Hybrid Automatic Repeat Requestor ACK and a CQI (Channel Quality Indicator).

Optionally, when the power offset parameter includes the third power offset value, before the determining a first power offset value used by a control channel corresponding to a first subframe, the method further includes: receiving notification signaling sent by the network side, where the notification signaling carries a power offset adjustment parameter, and the power offset adjustment parameter includes a fourth power offset value or a power adjustment value; or the UE obtains, by calculation according to a type of the first subframe, a fourth power offset value or a power adjustment value relative to the third power offset value.

Specifically, the determining, according to a power offset parameter configured by a network side, a first power offset value used by a control channel corresponding to a first subframe, and determining a second power offset value used by a control channel corresponding to a second subframe includes: determining the third power offset value as the second power offset value, and determining the fourth power offset value as the first power offset value; or determining a difference between the third power offset value and the power adjustment value as the first power offset value.

The notification signaling is RRC (Radio Resource Control) signaling or physical layer signaling.

102: The UE feeds back the control channel corresponding to the first subframe to the network side by using the first power offset value.

103: The UE feeds back the control channel corresponding to the second subframe to the network side by using the second power offset value.

It should be noted that the first subframe described in the embodiment is a subframe with a limitation on signal transmission or transmit power, for example, an ABS subframe, and the second subframe is a subframe with no limitation on signal transmission or transmit power, for example, a non-ABS subframe.

Compared with the prior art, in this embodiment of the present invention, according to a power offset parameter configured by a network side, a first power offset value used by a control channel corresponding to a first subframe can be determined, and a second power offset value used by a control channel corresponding to a second subframe is determined; the control channel corresponding to the first subframe is fed back to the network side by using the first power offset value; the control channel corresponding to the second subframe is fed back to the network side by using the second power offset value. For a UE working in multiflow transmission, different power offset values are used for HS-DPCCHs corresponding to different subframes, which resolves a problem that in a heterogeneous network scenario, more power is consumed when the UE feeds back an HS-DPCCH corresponding to an ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

Embodiment 2

Figure 2:
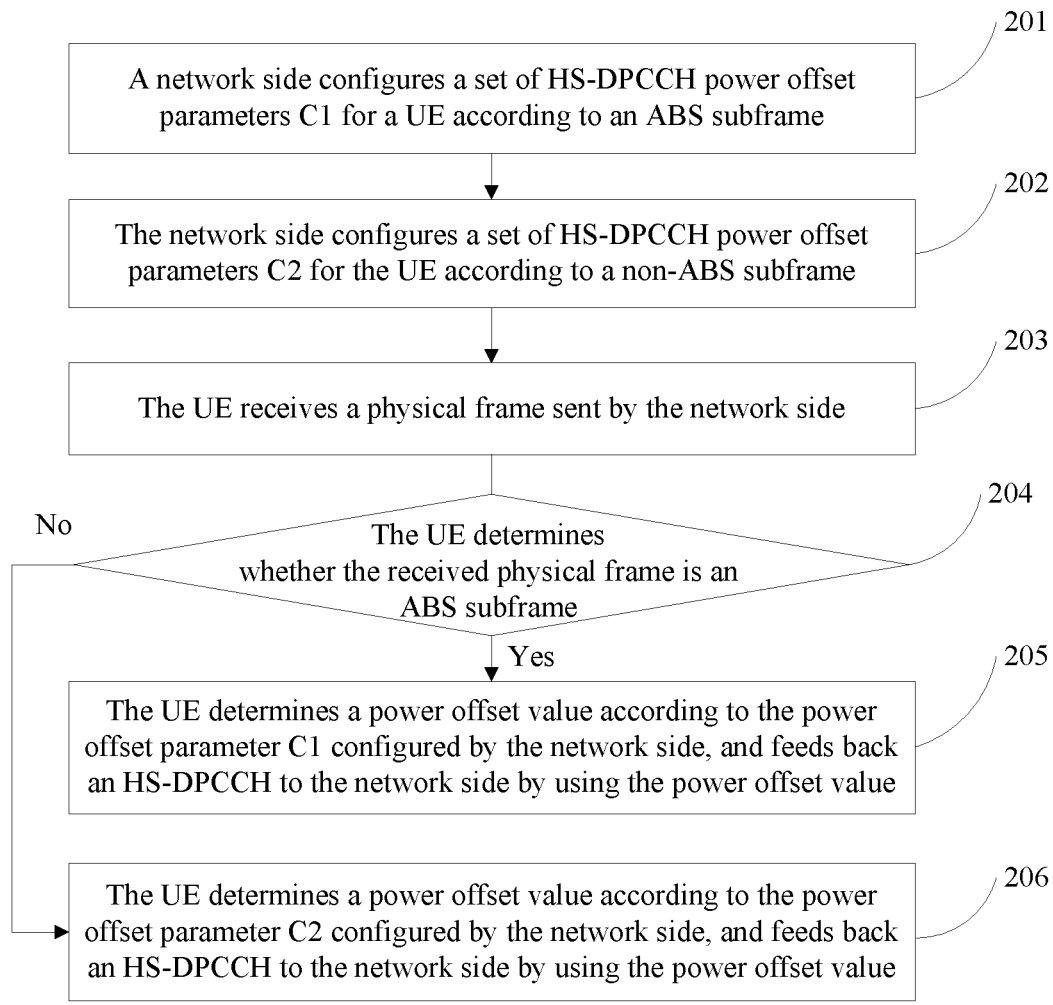
FIG. 2 is a flowchart of a method according to Embodiment 2 of the present invention.

This embodiment provides a power control method, where a UE works in a MultiFlow (multiflow) transmission mode, and the UE is in a Single-Frequency Dual-Cell (SF-DC), where a first subframe is an ABS subframe, and a second subframe is a non-ABS subframe. As shown in FIG. 2, the method includes:

201: A network side configures a set of HS-DPCCH power offset parameters C1 for the UE according to an ABS subframe.

202: The network side configures a set of HS-DPCCH power offset parameters C2 for the UE according to a non-ABS subframe.

It should be noted that there is no strict sequence between step 201 and step 202, and the two steps may also be executed simultaneously.

203: A UE receives a physical frame sent by the network side.

The physical frame may include an ABS subframe and a non-ABS subframe, where the ABS subframe is sent by a macro cell, and is used to reduce interference to a subframe that is sent by a micro cell at the same time. For example, a Pattern of the ABS subframe may be [100000100000100000100000100000].

204: The UE determines whether the received physical frame is an ABS subframe; if it is an ABS subframe, step 205 is executed; if it is a non-ABS subframe, step 206 is executed.

205: The UE determines a power offset value according to the power offset parameter C1 configured by the network side, and feeds back an HS-DPCCH to the network side by using the power offset value.

Optionally, because the ABS subframe is sent by the macro cell to reduce communication interference to the micro cell, the HS-DPCCH fed back by the UE for the ABS subframe is actually of no help to the macro cell. Therefore, when the UE feeds back the HS-DPCCH (which mainly includes a CQI and HARQ-ACK) for the ABS subframe, only information of the micro cell may be carried in the HS-DPCCH.

206: The UE determines a power offset value according to the power offset parameter C2 configured by the network side, and feeds back an HS-DPCCH to the network side by using the power offset value.

It should be noted that the UE is in a heterogeneous network scenario in which two communication networks, namely, a macro network and a micro network, are included, the UE is located within coverage of both the micro cell and the macro cell, and performs multiflow transmission with the two cells, and the UE feeds back the HS-DPCCH to the two cells by means of joint feedback. After receiving a joint feedback from the UE, the macro cell and the micro cell need to independently obtain respective feedback information by parsing, and perform scheduling on the UE according to the feedback information.

Compared with the prior art, in this embodiment of the present invention, a network side configures a set of HS-DPCCH power offset parameters C1 for a UE according to an ABS subframe; the network side configures a set of HS-DPCCH power offset parameters C2 for the UE according to a non-ABS subframe; the UE receives a physical frame sent by the network side; the UE determines whether the received physical frame is an ABS subframe, if it is an ABS subframe, the UE determines a power offset value according to the power offset parameter C1 configured by the network side, and feeds back an HS-DPCCH to the network side by using the power offset value, and if it is a non-ABS subframe, the UE determines a power offset value according to the power offset parameter C2 configured by the network side, and feeds back an HS-DPCCH to the network side by using the power offset value. For a UE working in multiflow transmission, different power offset values are used for HS-DPCCHs corresponding to the ABS subframe and the non-ABS subframe, which resolves a problem that in a heterogeneous network scenario, more power is consumed when the UE feeds back the HS-DPCCH corresponding to the ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

Embodiment 3

Figure 3:
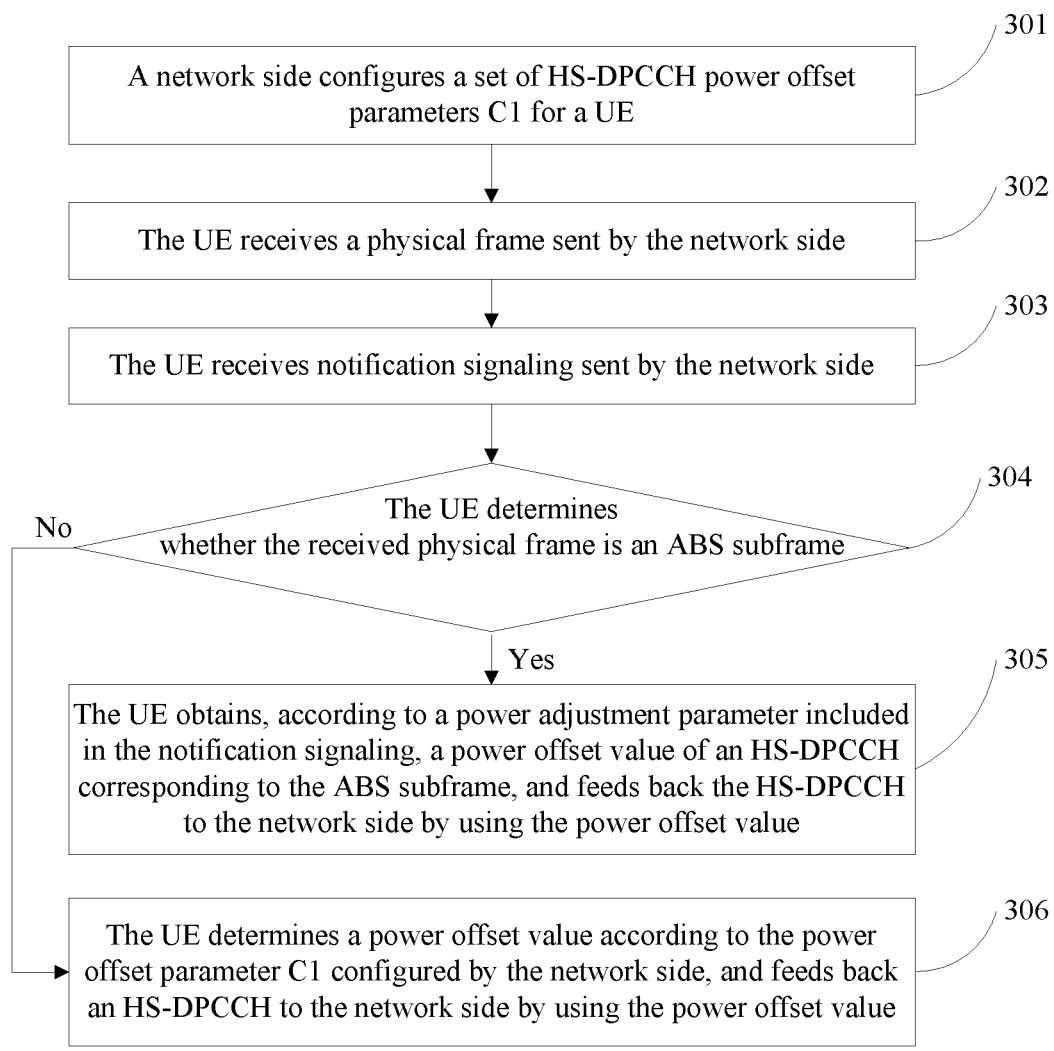
FIG. 3 is a flowchart of a method according to Embodiment 3 of the present invention.

This embodiment provides a power control method, where a UE works in a MultiFlow (multiflow) transmission mode, and the UE is in a Single-Frequency Dual-Cell (SF-DC), where a first subframe is an ABS subframe, and a second subframe is a non-ABS subframe. As shown in FIG. 3, the method includes:

301: A network side configures a set of HS-DPCCH power offset parameters Cl for the UE.

302: The UE receives a physical frame sent by the network side.

The physical frame may include an ABS subframe and a non-ABS subframe, where the ABS subframe is sent by a macro cell, and is used to reduce interference to a subframe that is sent by a micro cell at the same time. For example, a Pattern of the ABS subframe may be [100000100000100000100000100000].

303: The UE receives notification signaling sent by the network side.

The notification signaling includes a power adjustment parameter, where the power adjustment parameter is used by the UE to determine a power offset value of an HS-DPCCH corresponding to the ABS subframe.

Optionally, the notification signaling is RRC signaling or physical layer signaling, where the physical layer signaling includes an HS-SCCH (High-Speed Shared Control Channel for HS-DSCH (high-speed downlink shared control channel)) command.

304: The UE determines whether the received physical frame is an ABS subframe; if it is an ABS subframe, step 305 is executed; if it is a non-ABS subframe, step 306 is executed.

305: The UE obtains, according to a power adjustment parameter included in the notification signaling, a power offset value of an HS-DPCCH corresponding to the ABS subframe, and feeds back the HS-DPCCH to the network side by using the power offset value.

For example, the notification signaling may directly include the power offset value of the HS-DPCCH corresponding to the ABS subframe, or include a relative power offset value, and the power offset value of the HS-DPCCH corresponding to the ABS subframe is determined according to a power offset value corresponding to the power offset parameter C1 and the relative power offset value, for example, Power offset value of HS-DPCCH corresponding to ABS subframe =Power offset value corresponding to power offset parameter C1—Relative power offset value.

The power offset value of the HS-DPCCH corresponding to the ABS subframe is far less than the power offset value corresponding to the power offset parameter C1.

Optionally, the UE may further obtain by calculation a fourth power offset value or a power adjustment value relative to a third power offset value.

306: The UE determines a power offset value according to the power offset parameter C1 configured by the network side, and feeds back an HS-DPCCH to the network side by using the power offset value.

It should be noted that the UE is in a heterogeneous network scenario in which two communication networks, namely, a macro network and a micro network, are included, the UE is located within coverage of both the micro cell and the macro cell, and performs multiflow transmission with the two cells, and the UE feeds back the HA-DPCCH to the two cells by means of joint feedback. After receiving a joint feedback from the UE, the macro cell and the micro cell need to independently obtain respective feedback information by parsing, and perform scheduling on the UE according to the feedback information.

Compared with the prior art, in this embodiment of the present invention, a network side configures a set of HS-DPCCH power offset parameters C1 for a UE according to an ABS subframe; the UE receives a physical frame sent by the network side; the UE receives notification signaling sent by the network side; the UE determines whether the received physical frame is an ABS subframe, if it is an ABS subframe, the UE obtains, according to a power adjustment parameter included in the notification signaling, a power offset value of an HS-DPCCH corresponding to the ABS subframe, and feeds back the HS-DPCCH to the network side by using the power offset value, and if it is a non-ABS subframe, the UE determines a power offset value according to the power offset parameter C1 configured by the network side, and feeds back an HS-DPCCH to the network side by using the power offset value. For a UE working in multiflow transmission, different power offset values are used for HS-DPCCHs corresponding to the ABS subframe and the non-ABS subframe, which resolves a problem that in a heterogeneous network scenario, more power is consumed when the UE feeds back the HS-DPCCH corresponding to the ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

Embodiment 4

Figure 4:
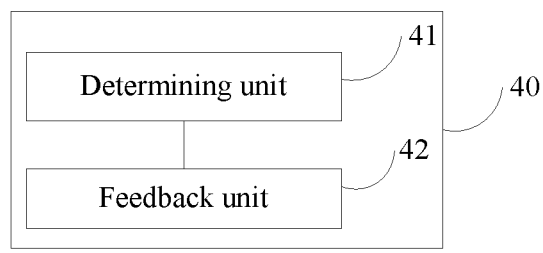
FIG. 4 and FIG. 5 are schematic structural diagrams of an apparatus according to Embodiment 4 of the present invention.

This embodiment provides a power control apparatus 40. As shown in FIG. 4, the apparatus 40 includes:

a determining unit 41, configured to: determine, according to a power offset parameter configured by a network side, a first power offset value used by a control channel corresponding to a first subframe, and determine a second power offset value used by a control channel corresponding to a second subframe; and a feedback unit 42, configured to feed back the control channel corresponding to the first subframe to the network side by using the first power offset value determined by the determining unit 41; and configured to feed back the control channel corresponding to the second subframe to the network side by using the second power offset value determined by the determining unit 41.

The power offset parameter includes: a first power offset parameter and a second power offset parameter; or a third power offset value.

Specifically, the determining unit 41 is configured to: determine the first power offset value according to the first power offset parameter, and determine the second power offset value according to the second power offset parameter.

When the feedback unit 42 feeds back the control channel corresponding to the first subframe to the network side by using the first power offset value, a subframe of the control channel includes only feedback information of a micro Pico cell, and the feedback information includes a hybrid automatic repeat request-acknowledgment HARQ-ACK and a channel quality indicator CQI.

Figure 5:
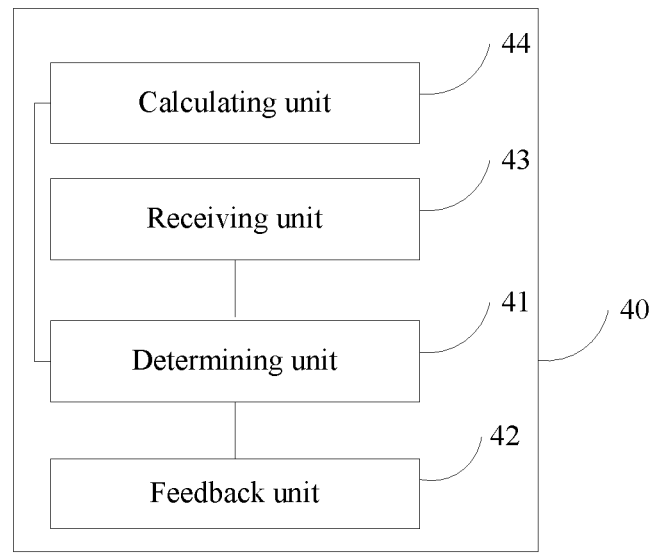

Further, as shown in FIG. 5, the apparatus 40 may further include:

a receiving unit 43, configured to receive notification signaling sent by the network side, where the notification signaling carries a power offset adjustment parameter, and the power offset adjustment parameter includes a fourth power offset value or a power adjustment value; or a calculating unit 44, configured to: obtain a fourth power offset value by calculation according to the first subframe or obtain, by calculation, a power adjustment value relative to the third power offset value.

Further, the determining unit 41 is specifically configured to:

determine the third power offset value as the second power offset value, and determine the fourth power offset value as the first power offset value; or determine a difference between the third power offset value and the power adjustment value as the first power offset value.

The notification signaling is radio resource control RRC signaling or physical layer signaling.

The first subframe is a subframe with a limitation on signal transmission or transmit power, and the second subframe is a subframe with no limitation on signal transmission or transmit power.

Compared with the prior art, in this embodiment of the present invention, according to a power offset parameter configured by a network side, a first power offset value used by a control channel corresponding to a first subframe can be determined, and a second power offset value used by a control channel corresponding to a second subframe is determined; the control channel corresponding to the first subframe is fed back to the network side by using the first power offset value; the control channel corresponding to the second subframe is fed back to the network side by using the second power offset value. For a UE working in multiflow transmission, different power offset values are used for HS-DPCCHs corresponding to different subframes, which resolves a problem that in a heterogeneous network scenario, more power is consumed when the UE feeds back an HS-DPCCH corresponding to an ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

Embodiment 5

Figure 6:
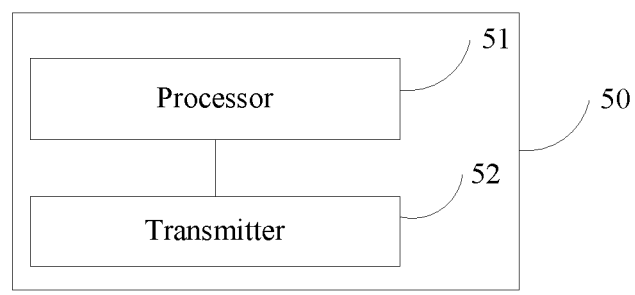
FIG. 6 and FIG. 7 are schematic structural diagrams of a user equipment according to Embodiment 5 of the present invention.

This embodiment provides a user equipment UE 50. As shown in FIG. 6, the user equipment 50 includes:

a processor 51, configured to: determine, according to a power offset parameter configured by a network side, a first power offset value used by a control channel corresponding to a first subframe, and determine a second power offset value used by a control channel corresponding to a second subframe; and a transmitter 52, configured to feed back the control channel corresponding to the first subframe to the network side by using the first power offset value determined by the processor 51; and configured to feed back the control channel corresponding to the second subframe to the network side by using the second power offset value determined by the processor 51.

The power offset parameter includes: a first power offset parameter and a second power offset parameter; or a third power offset value.

Specifically, the processor 51 is configured to: determine the first power offset value according to the first power offset parameter, and determine the second power offset value according to the second power offset parameter.

When the transmitter 52 feeds back the control channel corresponding to the first subframe to the network side by using the first power offset value, a subframe of the control channel includes only feedback information of a micro Pico cell, and the feedback information includes a hybrid automatic repeat request-acknowledgment HARQ-ACK and a channel quality indicator CQI.

Figure 7:
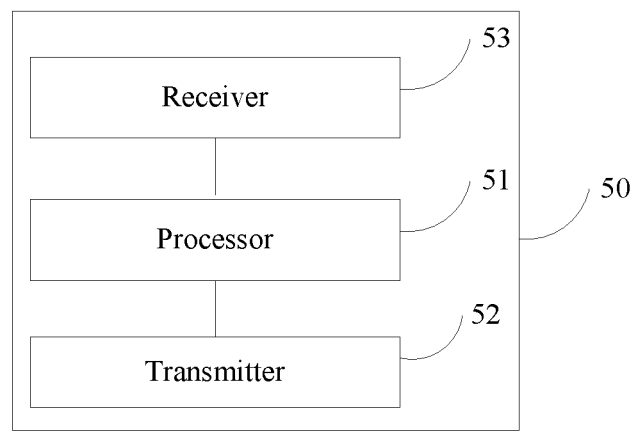

Further, as shown in FIG. 7, the user equipment 50 may include:

a receiver 53, configured to receive notification signaling sent by the network side, where the notification signaling carries a power offset adjustment parameter, and the power offset adjustment parameter includes a fourth power offset value or a power adjustment value; or the processor 51, further configured to obtain a fourth power offset value by calculation according to the first subframe or obtain, by calculation, a power adjustment value relative to the third power offset value.

Further, the processor 51 is further specifically configured to:

determine the third power offset value as the second power offset value, and determine the fourth power offset value as the first power offset value; or determine a difference between the third power offset value and the power adjustment value as the first power offset value.

The notification signaling is radio resource control RRC signaling or physical layer signaling.

The first subframe is a subframe with a limitation on signal transmission or transmit power, and the second subframe is a subframe with no limitation on signal transmission or transmit power.

Compared with the prior art, in this embodiment of the present invention, according to a power offset parameter configured by a network side, a first power offset value used by a control channel corresponding to a first subframe can be determined, and a second power offset value used by a control channel corresponding to a second subframe is determined; the control channel corresponding to the first subframe is fed back to the network side by using the first power offset value; the control channel corresponding to the second subframe is fed back to the network side by using the second power offset value. For a UE working in multiflow transmission, different power offset values are used for HS-DPCCHs corresponding to different subframes, which resolves a problem that in a heterogeneous network scenario, more power is consumed when the UE feeds back an HS-DPCCH corresponding to an ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

The power control apparatus provided in the embodiments of the present invention may implement the method embodiments provided above; for specific function implementation, refer to the description in the method embodiments, and details are not described herein again. The power control method and apparatus provided in the embodiments of the present invention may be applicable to a multiflow transmission scenario in which a UE feeds back control information to a network side, to which it is not limited.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power control method, comprising:

determining, by a user equipment, according to a power offset parameter configured by a network side, a first power offset value used by a control channel corresponding to a first subframe, and a second power offset value used by a control channel corresponding to a second subframe;

feeding back, by the user equipment, the control channel corresponding to the first subframe, to the network side by using the first power offset value; and feeding back, by the user equipment, the control channel corresponding to the second subframe, to the network side by using the second power offset value, wherein the network side is a base station, wherein the determining, according to the power offset parameter configured by the network side, the first power offset value used by the control channel corresponding to the first subframe, and the second power offset value used by the control channel corresponding to the second subframe comprises:

determining the first power offset value according to a first power offset parameter, and determining the second power offset value according to a second power offset parameter, wherein when the control channel corresponding to the first subframe is fed back to the network side by using the first power offset value, a subframe of the control channel comprises only feedback information of a micro Pico cell, and the feedback information comprises a hybrid automatic repeat request-acknowledgment (HARQ-ACK) and a channel quality indicator (CQI).

2. The method according to claim 1, wherein the power offset parameter comprises:
the first power offset parameter and the second power offset parameter; or
a third power offset value.

3. The method according to claim 2, wherein when the power offset parameter comprises only the third power offset value, before the determining the first power offset value used by the control channel corresponding to the first subframe, the method further comprises:
receiving notification signaling sent by the network side, wherein the notification signaling carries a power offset adjustment parameter, and the power offset adjustment parameter comprises a fourth power offset value or a power adjustment value; or
obtaining a fourth power offset value by calculation according to the first subframe or obtaining, by calculation, a power adjustment value relative to the third power offset value.

4. The method according to claim 3, wherein the determining, according to the power offset parameter configured by the network side, the first power offset value used by the control channel corresponding to the first subframe, and the second power offset value used by the control channel corresponding to the second subframe comprises:
determining the third power offset value as the second power offset value, and determining the fourth power offset value as the first power offset value; or determining a difference between the third power offset value and the power adjustment value as the first power offset value.

5. The method according to claim 3, wherein the notification signaling is radio resource control (RRC) signaling or physical layer signaling.

6. The method according to claim 1, wherein the first subframe is a subframe with a limitation on signal transmission or transmit power, and the second subframe is a subframe with no limitation on signal transmission or transmit power.

7. A user equipment, comprising:
a processor, configured to:
determine, according to a power offset parameter configured by a network side, a first power offset value used by a control channel corresponding to a first subframe, and a second power offset value used by a control channel corresponding to a second subframe; and
a transmitter, configured to
feed back, the control channel corresponding to the first subframe, to the network side by using the first power offset value determined by the processor; and
feed back, the control channel corresponding to the second subframe, to the network side by using the second power offset value determined by the processor,
wherein the network side is a base station,
wherein the processor is configured to: determine the first power offset value according to a first power offset parameter, and determine the second power offset value according to a second power offset parameter,
wherein when the transmitter feeds back the control channel corresponding to the first subframe to the network side by using the first power offset value, a subframe of the control channel comprises only feedback information of a micro Pico cell, and the feedback information comprises a hybrid automatic repeat request-acknowledgment (HARQ-ACK) and a channel quality indicator (CQI).

8. The user equipment according to claim 7, wherein the power offset parameter comprises:
the first power offset parameter and the second power offset parameter; or
a third power offset value.

9. The user equipment according to claim 8, wherein the user equipment further comprises:
a receiver, configured to receive notification signaling sent by the network side, wherein the notification signaling carries a power offset adjustment parameter, and the power offset adjustment parameter comprises a fourth power offset value or a power adjustment value; or
the processor, further configured to obtain a fourth power offset value by calculation according to the first subframe, or obtain, by calculation, a power adjustment value relative to the third power offset value.

10. The user equipment according to claim 9, wherein the processor is further configured to:
determine the third power offset value as the second power offset value, and determine the fourth power offset value as the first power offset value; or determine a difference between the third power offset value and the power adjustment value as the first power offset value.

11. The method according to claim 1, wherein the first subframe is a subframe with a limitation on signal transmission or transmit power while the second subframe is a subframe with no limitation on signal transmission or transmit power.

12. The method according to claim 11, wherein the first subframe is an Almost Blank Subframe (ABS) subframe while the second subframe is a non-ABS subframe.

13. The user equipment according to claim 7, wherein the first subframe is a subframe with a limitation on signal transmission or transmit power while the second subframe is a subframe with no limitation on signal transmission or transmit power.

14. The user equipment according to claim 13, wherein the first subframe is an Almost Blank Subframe (ABS) subframe while the second subframe is a non-ABS subframe.

* * * * *